US005501881A

United States Patent [19]

Fuller et al.

[11] Patent Number: 5,501,881

[45] Date of Patent: Mar. 26, 1996

[54] COATED FUSER MEMBER PROCESSES

[75] Inventors: Timothy J. Fuller, Pittsford; Joseph Mammino, Penfield; Paul J. Brach, Rochester; Robert Blaszak, Penfield; Robert N. Finsterwalder, Webster; Santokh S. Badesha, Pittsford, all of N.Y.

[73] Assignee: Xerox Corporation, Stamford, Conn.

[21] Appl. No.: 347,667

[22] Filed: Dec. 1, 1994

[51] Int. Cl.[6] .......... B05D 1/02

[52] U.S. Cl. .......... 427/421; 427/435; 430/99; 492/53; 492/56

[58] Field of Search .......... 427/385.5, 387, 427/388.1, 421, 435; 430/99, 124; 492/53, 56

[56] References Cited

U.S. PATENT DOCUMENTS

| | | | |
|---|---|---|---|
| 4,029,827 | 6/1977 | Imperial et al. | 427/22 |
| 4,101,686 | 7/1978 | Strella et al. | 427/22 |
| 4,257,699 | 3/1981 | Lentz | 355/3 FU |
| 4,264,181 | 4/1981 | Lentz et al. | 355/3 FU |
| 4,272,179 | 6/1981 | Seanor | 355/3 FU |
| 5,395,725 | 3/1995 | Bluett et al. | 430/124 |

*Primary Examiner*—Michael Lusignan
*Attorney, Agent, or Firm*—E. O. Palazzo

[57] ABSTRACT

A process for the preparation of a fuser member which comprises applying to a fuser supporting substrate a coating mixture of a fluoropolymer, and an aliphatic alcohol.

19 Claims, No Drawings

COATED FUSER MEMBER PROCESSES

BACKGROUND OF THE INVENTION

This invention generally relates to fusing members and, more specifically, the present invention relates to processes for the preparation of fuser members like fuser rolls wherein the coating applied to the fuser member contains a coating mixture of VITON®, and an aliphatic alcohol like methanol. By adding the alcohol to the coating mixture, the life thereof, especially the pot life, can be increased to from about 4 to about 24 hours, and the solids content of the flow coating mixture can be increased to, for example, about 30 percent in embodiments. High solids contents of the fuser roll flow coating mixture, most typically at 25 weight percent solids, comprised of VITON GF® (available from E. I. DuPont, 60 parts, 20.33 weight percent), magnesium hydroxide (Merck and Company, MAGLITE D™, 1.2 parts, 0.407 weight percent), calcium hydroxide (Baker reagent grade, 0.6 part, 0.203 weight percent), copper oxide (American Chemet: 13600, 9 parts, 3.05 weight percent), VITON CURATIVE 50® (DuPont, 3 parts, 1.02 weight percent), methyl isobutyl ketone (197.78 parts, 67 weight percent), and methanol (Fisher Scientific, 23.62 parts, 8 weight percent), enables, for example, the flow coating application of 8 mil thick fuser roll coatings to be obtained more economically and specifically with fewer passes compared with spray painting of mixtures most typically selected, such as about 8 weight percent solids VITON GF® (15.7 parts, 6.50 weight percent), MAGLITE D™ (0.313 part, 0.13 weight percent), calcium hydroxide (0.1567 part, 0.065 weight percent), copper oxide (2.351 parts, 0.976 weight percent), VITON CURATIVE 50® (0.784 part, 0.325 weight percent), methyl isobutyl ketone (221.6 parts, 92.0 weight percent), and no alcohol like methanol.

Advantages of the fuser members of the present invention include avoiding or minimizing offsetting of molten toner images during fusing processes required to fix toner images to paper and plastic, improved fusing latitude, reduction in offsetting from preprinted forms, high thermal conductivity, and providing a high water contact angle, for example between 90° and 95°, to release surface in those areas where the fluoroelastomer coating normally interacts with paper and fused toner images. Enhanced release of molten toner from the fuser roll can thus result. Moreover, the fuser coatings of the instant invention allow for conformable toner image fusing enabling matte images selected specifically in marketing studies for their appearance.

The types of components, such as rolls, that can be provided with the coatings of the present invention are illustrated, for example, in U.S. Pat. Nos. 4,373,239 and 4,518,655, the disclosures of which are totally incorporated herein by reference.

In a typical electrostatographic reproducing apparatus, a light image of an original to be copied is recorded in the form of an electrostatic latent image upon a photosensitive member, and the latent image is subsequently rendered visible by the application of electroscopic thermoplastic resin particles and pigment particles, or toner. The visible toner image is then in a loose powdered form and can be easily disturbed or destroyed. The toner image is usually fixed or fused upon a support which may be the photosensitive member itself or other support sheet, such as plain paper.

The use of thermal energy for fixing toner images onto a support member is known. To fuse electroscopic toner material onto a support surface permanently by heat, it is usually necessary to elevate the temperature of the toner composition to a point at which the constituents of the toner material coalesce and become tacky. This heating causes the toner to flow to some extent into the fibers or pores of the support member, such as paper. Thereafter, as the toner cools, solidification of the toner causes it to be firmly bonded to the support.

Typically, the thermoplastic resin particles are fused to the substrate by heating to a temperature of between about 90° C. to about 160° C. or higher depending upon the softening range of the particular resin used in the toner. It is undesirable, however, to raise the temperature of the substrate substantially higher than about 200° C. because, for example, of the tendency of the substrate to discolor at such elevated temperatures, particularly when the substrate is paper.

Several methods for the thermal fusing of electroscopic toner images have been described in the prior art. These methods include the application of heat and pressure substantially concurrently by various means like a roll pair maintained in pressure contact, a belt member in pressure contact with a roll, and the like. Heat may be applied by heating one or both of the rolls, plate members or belt members. The fusing of the toner results when the proper combination of heat, pressure and contact time are provided.

During operation of a fusing system in which heat is applied to permit thermal fusing of the toner particles onto a support, both the toner image and the support are passed through a nip formed between the roll pair, plate, or belt members. The concurrent transfer of heat and the application of pressure in the nip effects the fusing of the toner image onto the support. It is important in the fusing process that no offset of the toner particles from the support to the fuser member takes place during normal operations. Toner offset onto the fuser member may subsequently transfer to other parts of the machine or onto the support in subsequent copying cycles, thus increasing the background or interfering with the material being copied. This is referred to as "hot offset" and occurs when the temperature of the toner is increased to a point where the toner particles liquefy and a splitting of the molten toner takes place during the fusing operation with a portion remaining on the fuser member. The hot offset temperature, or degradation of the hot offset temperature is a measure of the release property of the fuser roll, and accordingly, it is desirable to provide a fusing surface, which has a low surface energy to provide the necessary effective release. To insure and maintain good release properties of the fuser roll, it has become customary to apply release agents to the fuser members to ensure that the toner is completely released from the fuser roll during the fusing operation. Typically, these materials are applied as thin films of, for example, silicone oils to prevent toner offset.

Described in U.S. Pat. No. 4,264,181, U.S. Pat. No. 4,257,699 and U.S. Pat. No. 4,272,179, all commonly assigned to the assignee of the present application, the disclosures of which are totally incorporated herein by reference, are fuser members and certain release agents. These patents describe specific fuser members and methods of fusing thermoplastic resin toner images to a substrate wherein a certain polymeric release agent having functional groups is applied to the surface of the fuser member. The fuser member comprises a base member having an elastomeric surface with a metal containing filler therein which has been cured with a nucleophilic addition curing agent. Exemplary of such a fuser member is an aluminum base member with a poly(vinylidenefluoridehexafluoropropylene) copolymer cured with a bisphenol curing agent with lead oxide or copper oxide filler dispersed therein and utilizing a mercapto functional polyorgano siloxane oil as a release agent. In these fusing processes, the polymeric release agents have functional groups, also designated as chemically reactive functional groups, which interact with the metal containing filler dispersed in the elastomer or resinous material of the fuser member surface to form a thermally stable film which releases thermoplastic resin toner, and which prevents the thermoplastic resin toner from contacting the elastomer material itself. The metal oxide, metal salt, metal alloy or other suitable metal compound filler dispersed in the elastomer or resin upon the fuser member surface interacts with the functional groups of the siloxane polymeric release agent. Preferably, the metal containing filler materials do not cause degradation of or have any adverse effect upon the polymeric release agent having functional groups. Because of this reaction between the elastomer having a metal containing filler and the polymeric release agent having functional groups, excellent release and the generation of high quality copies are obtained even at high rates of speed, such as 100 copies per minute, of electrostatographic reproducing machines. With these VITON®/lead oxide, or VITON®/copper oxide members, an oxide of low volume fraction is added to enable a specific functional release agent to react with it and thereby coat the silicone polymer oil like a polysiloxane, while with the present invention in embodiments the fillers, which are preferably selected in amounts of from about 5 to 20 weight percent based on the amount of fluoroelastomer rubber, are covered with a mercapto terminated silicone oil, rather than the polysiloxane oil. Thus, with the present invention improved toner and oil release is achieved from the fuser roll. When the copper oxide is omitted from the formulation, an amino-terminated silicone oil is used to coat the fluoroelastomer on the fuser roll.

The use of polymeric release agents possessing functional groups, which interact with a fuser member to form a thermally stable, renewable self-cleaning layer having superior release properties for electroscopic thermoplastic resin toners, is described in U.S. Pat. Nos. 4,029,827; 4,101,686 and 4,185,140, all commonly assigned to the assignee of the present invention. Disclosed in U.S. Pat. No. 4,029,827 is the use of polyorgano siloxanes having mercapto functionality as release agents. U.S. Pat. Nos. 4,101,686 and 4,185,140 are directed to polymeric release agents having functional groups such as carboxy, hydroxy, epoxy, amino, isocyanate, thioether and mercapto groups as release fluids. The disclosures of all of the aforementioned patents are totally incorporated herein by reference.

SUMMARY OF THE INVENTION

In accordance with embodiments of the present invention there is provided a fuser member, and processes thereof.

In embodiments of the present invention there are provided processes for the preparation of fuser member coatings, especially for the Xerox Corporation 5090®, from mixtures of the coating and an aliphatic alcohol, and wherein the coating mixture possesses a long reaction pot life, for example an increase of from about 1 hour to about 30 hours, and a high solids content.

In embodiments, the process of the present invention comprises formulating a fuser member coating mixture containing an aliphatic alcohol, followed by applying this mixture to a fuser member substrate. More specifically, it has been determined that the pot life of a fuser coating mixture can be extended by more than a factor of 5 by adding, for example, between about 5 and 10 weight percent of an aliphatic alcohol, preferably methanol to, for example, VITON GF® (60 grams), MAGLITE D™ (1.2 grams), $Ca(OH)_2$ (0.6 gram), CuO (9 grams), and VITON CURATIVE 50® (3.0 grams) in sufficient methyl isobutyl ketone to prepare mixtures containing between 20 and 25 weight percent solids. Moreover, the concentration of the coating mixture with the alcohol increases, for example, to 27 weight percent with 10 weight percent of methanol while maintaining pot life for more than 30 hours.

The stability of coating solutions can be determined by measuring viscosity versus aging time of the flow coating mixtures. Viscosity was measured using a Brookfield LV viscometer and spindle number 4 at 12 revolutions per minute. Based on Brookfield viscosity versus time measurements it was determined that the optimum weight percent solids of the flow coating mixtures is between 22 and 32 weight percent (measured gravimetrically) for appropriate flow coating solution viscosities of ideally less than 1,000 centipoise after 24 hours.

VITON GF® solutions were prepared with a Union Process O1 shot mill attritor within 1 hour (with jacketed water cooling) or within 30 minutes without cooling (the temperature rise without cooling was between 25° and 33° C.). Also, the VITON GF® solutions (polymer alone in methyl isobutyl ketone) appear indefinitely stable. When bisphenol curative (1.02 weight percent) was added, the VITON GF® flow coating mixtures at 25 weight percent solids had short pot lives of less than 4 hours. Further, when between 5 and 10 weight percent of methanol was added to the VITON GF® flow coating mixtures at 25 weight percent solids, the pot life was markedly increased to more than 24 hours. A 27 weight percent VITON GF® flow coating mixture with 10 weight percent of methanol had a pot life greater than 30 hours. By comparison, a 25 weight percent VITON GF® flow coating mixture with 5 weight percent of methanol had a pot life of 23.5 hours. The optimum amount of methanol under the conditions used is about 8 weight percent to ensure at least a 24 hour pot life. Further, high solids flow coating mixtures permit thicker fuser coatings with fewer passes and fuser roll production can be increased.

A rubber roll mill or other suitable melt mixing apparatus can be used to form slabs of fluoroelastomer rubber to effect mixing with fillers before the Union Process O1 attritor is used to form the flow coating mixture in methyl isobutyl ketone. The slab is chopped or cut into appropriate dimensions to dissolve the polymer.

In embodiments, the fuser member is comprised of a core, such as metals, with a coating, usually continuous, of a thermally conductive and resilient compressible material which has a high thermomechanical strength, which coating includes alpha, omega, hydroxy polydimethyl siloxane with a number average molecular weight of about 5,000 to about 20,000, finely divided tabular alumina, finely divided iron oxide, crosslinking agent, and crosslinking catalyst, and wherein the coating is present in various effective thicknesses of, for example, from about 10 to about 100 mils, and wherein there is applied to the fuser roll a silicone hydride release agent causing reaction of the release agent with a metal oxide filler. Examples of fuser members that may be selected for the present invention are illustrated in U.S. Pat. No. 4,373,239, the disclosure of which is totally incorporated herein by reference.

A typical fuser member of the present invention is described in conjunction with a fuser assembly comprised of a multilayered fuser roll comprising in sequential order a base support member, and a relatively thick coating layer like VITON GF®, or a silicone elastomer layer thereover, an amino silane primer layer, an adhesive layer, and a metal oxide filler dispersed in the silicone elastomer layer, and wherein the filler is caused to react with a silicone oil with SH functional groups, or functional group thereon. The base support member, which is typically a hollow cylinder or core, has suitable heating element disposed in the hollow portion thereof which is co-extensive with the cylinder. A backup or pressure roll cooperates with the fuser roll to form a fusing nip or contact arc through which a copy paper or other substrate passes such that toner images thereon contact the elastomer fusing surface of the fuser roll. The backup roll has a rigid steel core with a thin TEFLON®, Trademark of E. I. DuPont de Nemours, Inc., surface layer 24 thereon.

Any suitable thermally conductive fluorocarbon elastomer rubber layer may be employed on the substrate. Typically, it is prepared from bisphenol curable polyhexafluoropropylene-tetrafluoroethylene, and vinylidene fluoride polymers. Silicone elastomer can be combined with the fluoroelastomer in the coating compositions. Typically, it is prepared from peroxide curable polyorganosiloxane generally known as high temperature vulcanizates (HTVs) which are typically polydimethyl siloxanes with pendant vinyl groups such as are illustrated herein

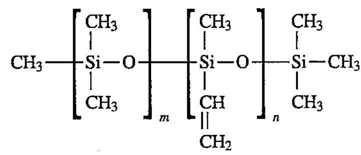

including trifluoropropyl, cyanopropyl, phenyl and vinyl are used to substitute for some of the methyl groups in order to impart specific cure, mechanical or chemical properties to silicone rubber. Introduction of phenyl groups reduces elasticity and increases tensile and tear strength of vulcanizates. Phenyl groups reduce vulcanization yield. Trifluoropropyl groups increase solvent resistance. Introduction of low percentages of vinyl groups reduces vulcanization temperature and imparts greater elasticity and lower compression set to rubbers. Peroxide cure gums may also be vinyldimethylsiloxy terminated. The peroxides most commonly used are benzoyl peroxide and bis(dichlorobenzoyl) peroxide. Dicumyl peroxide can be used for vinyl containing polymers. Generally, peroxide loading is 0.2 to 1.0 percent and cure is at 120° to 140° C. In addition, other peroxides, such as 2,5-dimethyl-2,5-bis(t-butyl peroxy) hexane, can be used to crosslink HTVs at temperatures up to 180° C.

Adhesive materials that are particularly effective include gamma amino propyltriethoxy silane available from Union Carbide under the product name Union Carbide ORGANO-FUNCTIONAL SILANE A-1100™ and other suitable materials include N-(2-aminoethyl-3-aminopropyl) trimethoxysilane, 6-(aminohexylaminopropyl) trimethoxysilane, p-aminophenyltrimethoxysilane, 3-(1-aminopropoxy)-3,3-dimethyl-1-propenyltrimethoxysilane, 3-aminopropyltris-(methoxyethoxyethoxy) silane and N-(2-aminoethyl)-3-aminopropylmethyldimethoxy silane.

The surface of the fuser member of the present invention is preferably a roll, and preferably one prepared by flow coating, casting or molding.

The fuser coating, prior to thermal coating, contains an aliphatic alcohol as indicated herein in an amount, for example, of from about 1 to about 20 and preferably from about 5 to about 10 weight percent. Examples of aliphatic alcohols include those with from 1 to about 25 carbon atoms, and preferably from 1 to about 6 carbon atoms like methanol, ethanol, propanol, butanol, pentanol, trifluoroethanol in embodiments, and the like. Adding, for example, 5 to 10 weight percent of methanol to the fuser flow coating mixture can increase the pot life thereof to from about 30 to about 100 hours.

The following Examples further define and describe fuser members prepared by the present invention, and illustrate further embodiments of the present invention. Unless otherwise indicated, all parts and percentages are by weight.

EXAMPLE I

Preparation of VITON GF® Flow-Coating Mixture at 25 Weight Percent Solids with Methanol VITON GF®, a terpolymer of vinylidene fluoride, hexafluoropropylene and tetrafluoroethylene (E. I. DuPont, 60 grams), and methyl isobutyl ketone (197.8 grams) were stirred at ambient temperature (25° C.) using a Union Process O1 attritor containing ⅜ inch steel shot (2,500 grams) for 30 minutes to form a polymer solution. The attritor was externally cooled with a water jacket to maintain the solution temperature at 25° C. Without external cooling, the temperature of the solution in the attritor rose to 33° C. A mixture of magnesium hydroxide (Merck and Company, MAGLITE D™, 1.2 grams, 0.407 weight percent), calcium hydroxide (Baker reagent grade, 0.6 gram, 0.203 weight percent), copper oxide (American Chemet 13600, 9 grams, 3.05 weight percent), and VITON CURATIVE 50® (DuPont, 3 grams, 1.02 weight percent) was added and stirring was continued for 15 more minutes. Methanol (23.62 grams, 8 weight percent) was then added, and stirring was continued for 15 additional minutes. The resultant mixture was then filtered through ⅛ inch coarse nylon filter cloth, and the pot life of the filtrate, which was comprised of a 25 weight percent solids flow coating mixture of the VITON GF®, 20.33 weight percent, oxide MAGLITE D™, 0.41 weight percent, and copper oxide 3.05 weight percent, calcium hydroxide, 0.203 weight percent, VC 50®, 1.02 weight percent, 8 weight percent of methanol, and 67 weight percent of methyl isobutyl ketone, was determined by measuring viscosity with time. The viscosity measurements were generated using a Brookfield LV viscometer and spindle number 4 at an operating speed of 12 revolutions per minute. The meter reading was measured and multiplied by a factor of 500 to obtain the viscosity in centipoises. The viscosity of the mixture was initially 500 centipoises and increased linearly to 750 centipoises after 24 hours. Magnetic stirring of the mixture was maintained to prevent the heterogeneous copper oxide from settling out of the dispersion. By comparison, the pot life of a 25 weight percent solids flow coating mixture in methyl isobutyl ketone (221.4 grams) without methanol was 4 hours, that is, the viscosity of the mixture exceeded 1,000 centipoise after 4 hours. Moreover, the viscosity of a 25 weight percent solids flow coating mixture with 5 weight percent of methanol was initially 700 centipoise and increased to 1,040 centipoise after 24 hours; while the viscosity of a 25 weight percent solids flow coating mixture with 10 weight percent of methanol was initially 650 centipoise and increased to only 700 centipoise after 24 hours. The addition of 8 weight percent of methanol extended the pot life by more than a factor of 5 compared with the same formulation without methanol. The mechanical properties (tensile, elongation, and durometer) of 6 mil thick cured films cast with the flow coating mixtures containing methanol were the same as or superior to those of the control mixture with no methanol. Fuser rolls were fabricated by applying 3 coats of the flow coating mixture at 25 weight percent solids containing methanol onto metal rolls. The coated rolls were then thermally cured for 4 hours at 45° C., 2 hours at 75° C., 16 hours at 95° C., followed by ramp heating to 400° C. for 16 hours. The cured films ranged in thickness between 6 and 8 mils. The fuser roll was then placed in a xerographic copying machine, that is the Xerox Corporation 4850®, for evaluation. The coated fuser rolls were operated at a circumferential roll speed of about 15 inches per second with a biasing force between the fuser roll and the pressure roll of 30 pounds per linear inch along the length of the fuser roll. The temperature of the fuser roll was maintained at a temperature of about 335° F. A release agent of 13,000 centistokes of mercapto-functional polydimethyl siloxane oil was then applied to the fuser roll, and various types of preprinted forms were used as the substrate to fuse a toner of styrene-n-butylmethacrylate, 90 percent, and 10 percent of REGAL 330® carbon black thereon. No offsetting of toner or preprinted material was observed. The fuser rolls prepared evidenced excellent performance, and no or substantially no toner offset was observed.

EXAMPLE II

A slab of VITON GF® resin was prepared using a Banbury rubber roll mill at 400° F. to uniformly mix VITON GF® (60 grams), MAGLITE D™ (1.2 grams), calcium hydroxide (0.6 gram) and copper oxide (9 grams). The rubber slab was cut into ¼ inch pieces (57.6 grams) and allowed to dissolve in methyl isobutyl ketone (160.8 grams) with stirring for 30 minutes using a Union Process O1 attritor with externally jacketed water cooling. VITON CURATIVE 50®, DuPont proprietary bisphenol A based curative and organophosphonium salt, (2.4 grams) was then added and stirring was continued for 15 additional minutes. Methanol (19.2 grams) was then added and stirring was continued for 15 additional minutes more. The flow coating mixture was then filtered through ⅛ inch coarse nylon filter mesh, and the pot life of the resultant filtrate was determined by measuring viscosity with time using a Brookfield viscometer and spindle number 4 at 12 revolutions per minute. The initial viscosity was 400 centipoise and increased linearly to 760 centipoise after 24 hours. The pot life of the flow coating mixture was 30 hours, that is, the time required for the viscosity of the flow coating mixture to achieve 1,000 centipoise.

Other embodiments and modifications of the present invention may occur to those skilled in the art subsequent to a review of the information presented herein; these embodiments and modifications, as well as equivalents thereof, are also included within the scope of this invention.

What is claimed is:

1. A process for the preparation of a fuser member consisting essentially of applying to a fuser supporting substrate a coating mixture of a fluoropolymer, and an aliphatic alcohol, selected in an amount of from about 1 to about 20 weight percent.

2. A process in accordance with claim 1 wherein the aliphatic alcohol contains from 1 to about 25 carbon atoms.

3. A process in accordance with claim 1 wherein the mixture contains from about 5 to about 10 weight percent of aliphatic alcohol.

4. A process in accordance with claim 1 wherein the mixture contains from about 5 to about 10 weight percent of the aliphatic alcohol methanol.

5. A process in accordance with claim 1 wherein the mixture is selected in an amount of from about 25 to about 35 weight percent.

6. A process in accordance with claim 1 wherein the substrate is comprised of a metal, or a polymer.

7. A process in accordance with claim 6 wherein the polymer is an elastomeric fluorocarbon rubber.

8. A process in accordance with claim 1 wherein the coating mixture contains a polydimethylsiloxane of the formula

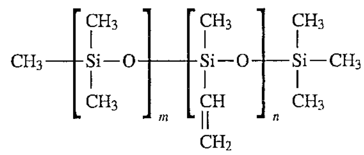

and wherein m and n represent the number of repeating segments.

9. A process in accordance with claim 1 wherein the substrate is of a thickness of from about 10 to about 1,000 microns.

10. A process in accordance with claim 1 wherein the aliphatic alcohol contains from 1 to about 15 carbon atoms.

11. A process in accordance with claim 1 wherein the coating mixture life is increased to from about 4 to about 24 hours, and the solids content of the coating mixture is increased to at least about 30 percent.

12. A process in accordance with claim 1 wherein the fuser member possesses excellent release characteristics.

13. A process in accordance with claim 1 wherein the coating mixture possesses extended stability.

14. A process in accordance with claim 1 wherein the coating mixture is applied by flow coating, spray coating, or dip coating methods.

15. A process in accordance with claim 8 wherein the aliphatic alcohol is methanol.

16. A process for the preparation of a fuser member consisting of applying to a fuser supporting substrate a coating mixture of a fluoropolymer, and an aliphatic alcohol, and wherein the fluoropolymer is a terpolymer of vinylidene fluoride, hexafluoropropylene and tetrafluoroethylene, magnesium hydroxide, calcium hydroxide, and bisphenol curative in methanol with a viscosity of less than about 1,000 to about 2,000 centipoise after about 24 hours.

17. A process in accordance with claim 16 wherein the alcohol is methanol selected in an amount of from 5 to 10 weight percent.

18. A process for the preparation of a fuser member which comprises applying to a fuser supporting substrate a coating mixture comprised of a fluoropolymer containing tetrafluoroethylene, hexafluoropropylene and vinylidene fluoride, and methanol.

19. A process for the preparation of a fuser member with a coating mixture comprised of about 25 weight percent solids, and which mixture is comprised of a terpolymer of vinylidene fluoride, hexafluoropropylene and tetrafluoroethylene, magnesium hydroxide, calcium hydroxide, and bisphenol curative in methanol with a viscosity of less than about 1,000 to about 2,000 centipoise after about 24 hours.

* * * * *